United States Patent
Skare (10) Patent No.: US 9,909,553 B2
(45) Date of Patent: Mar. 6, 2018

(54) RUNNER DEVICE FOR A HYDRAULIC FLUID FLOW MACHINE

(71) Applicant: Dynavec AS, Trondheim (NO)

(72) Inventor: Per Egil Skare, Trondheim (NO)

(73) Assignee: Dynavec AS, Trondheim (NO)

( * ) Notice: Subject to any disclaimer, the term of this patent is extended or adjusted under 35 U.S.C. 154(b) by 351 days.

(21) Appl. No.: 14/426,046

(22) PCT Filed: Sep. 3, 2013

(86) PCT No.: PCT/NO2013/050146
§ 371 (c)(1),
(2) Date: Mar. 4, 2015

(87) PCT Pub. No.: WO2014/038949
PCT Pub. Date: Mar. 13, 2014

(65) Prior Publication Data
US 2015/0252773 A1    Sep. 10, 2015

(30) Foreign Application Priority Data
Sep. 7, 2012   (NO) .................................... 20121011

(51) Int. Cl.
*F03B 3/12*    (2006.01)
*F04D 29/22*   (2006.01)

(52) U.S. Cl.
CPC ............... *F03B 3/121* (2013.01); *F03B 3/12* (2013.01); *F03B 3/128* (2013.01);
(Continued)

(58) Field of Classification Search
CPC .. F03B 3/12; F03B 3/121; F03B 3/128; F04D 29/2222; F04D 29/2211; F04D 29/282
See application file for complete search history.

(56) References Cited

U.S. PATENT DOCUMENTS 5,464,325 A * 11/1995 Albring ................. F04D 29/023
416/185
5,845,398 A   12/1998 Maumus et al.
(Continued)

FOREIGN PATENT DOCUMENTS

NO    327520 B1   7/2009
SE    505375 C2   8/1997

OTHER PUBLICATIONS

International Search Report issued in connection with PCT/NO2013/050146.
(Continued)

*Primary Examiner* — Woody Lee, Jr.
(74) *Attorney, Agent, or Firm* — Akerman LLP (57) ABSTRACT

A runner device (1) for a hydraulic fluid flow machine is described, the runner (1) including a runner hub (2) and a number of vanes (4) distributed around the center axis (S) of the runner (1), the vanes (4) being releasably connected to the runner (1) by means of bases (41) that complementarily fit grooves (21) in the runner hub (2), characterized by the grooves (21) in the runner hub (2) extending, at least at one of the outer edge portion (23) or the inner edge portion (25) of the runner hub, respectively all the way out to or all the way in to the edge portion (23, 25), whereby the bases (41) may extend radially out to or in to at least one of the outer edge portion (23) or the inner edge portion (25), respectively, of the runner hub (2). A method of providing a runner (1) for a hydraulic fluid flow machine is described as well.

10 Claims, 7 Drawing Sheets

(52) U.S. Cl.
CPC ........ *F04D 29/2222* (2013.01); *Y02E 10/223* (2013.01); *Y10T 29/49321* (2015.01)

(56) References Cited

U.S. PATENT DOCUMENTS

| | | | |
|---|---|---|---|
| 8,998,581 B2* | 4/2015 | Giovannetti | F04D 29/023 29/889.23 |
| 9,086,075 B2* | 7/2015 | Miller | F01D 5/048 |
| 2008/0286130 A1* | 11/2008 | Purvines | B23P 15/006 417/410.1 |
| 2010/0150725 A1* | 6/2010 | Krautheim | B23P 15/006 416/219 R |
| 2011/0033304 A1 | 2/2011 | Hezari et al. | |
| 2012/0121387 A1 | 5/2012 | Dahlhaug | |

OTHER PUBLICATIONS

Written Opinion of the International Searching Authority issued in connection with PCT/NO2013/050146.

* cited by examiner

Fig. 1

PRIOR ART

Fig. 2

PRIOR ART

RUNNER DEVICE FOR A HYDRAULIC FLUID FLOW MACHINE

This application is a national phase of PCT/NO2013/050146, filed Sep. 3, 2013, and claims priority to NO 20121011, filed Sep. 7, 2012, the entire contents of both of which are hereby incorporated by reference.

The invention relates to a runner device for a hydraulic fluid flow machine. More specifically, the invention relates to a runner device for a hydraulic fluid flow machine in which the runner includes a plurality of vanes releasably attached to a runner hub around the centre axis of the runner, and in which the vanes are attached to the runner hub by means of bases that complementarily fit grooves in the runner hub. The invention also relates to a method of providing a runner for a hydraulic fluid flow machine.

Runners for hydraulic fluid flow machines such as pumps and turbines may be subject to considerable wear. Particularly liable are runners passing particle-containing fluids. For example, arenaceous river water with hard particles has turned out to be able to wear out runners in turbines after a short time in use.

From the patent document NO 327520 B1, a runner for a fluid machine with vanes releasably connected to the runner is known. The vanes are connected to a runner hub by means of bases, which complementarily fit grooves in the runner hub, and screw connections. The patent document also discloses how the vanes and other runner components can be hard-coated with, for example, a carbide to increase the wear resistance and thereby the lifetime of a fluid machine which is subject to extensive wear and erosion.

The patent document US 20080286130 A1 discloses a runner with releasable and flexibly positionable vanes.

Prior-art runners have turned out to be liable to wear from particle-containing fluids in spite of advanced optimization of vane geometry and hard-coating of runner components. Among other things, it has turned out that corners, sharp edges and transitions between different components of the runner are particularly liable to wear, and then in particular corners, edges and so on, against which the water flow has a high velocity and a large normal component in towards the runner material.

The invention has for its object to remedy or to reduce at least one of the drawbacks of the prior art or at least to provide a useful alternative to the prior art.

The object is achieved through features which are specified in the description below and in the claims that follow.

In a first aspect, the invention relates to a runner device for a hydraulic fluid flow machine, the runner including a runner hub and a number of vanes distributed around the centre axis of the runner, the vanes being releasably connected to the runner by means of bases that complementarily fit grooves in the runner hub, characterized by the grooves in the runner hub, at least at one of the outer edge portion or inner edge portion of the runner hub, extending respectively all the way out to or all the way in to the edge portion, whereby the bases may extend radially out to or in to at least one of the outer edge portion or inner edge portion, respectively, of the runner hub.

The advantage of this is the transition between the base and the runner hub, which is a portion particularly subject to wear, being moved out to or over the outer edge portion and/or inner edge portion of the runner hub. The transition(s) is/are thus moved away from an area/areas of the runner in which the water velocity, and thus the wear, is particularly high in normal use.

In one embodiment, the grooves in the runner hub may extend all the way out to and all the way in to both the outer edge portion and the inner edge portion, respectively, of the runner hub. This means that the above-mentioned problems of wear and erosion can be avoided or at least reduced at both the inlet and the outlet of the runner, as the bases can be extended all the way out to or over both the outer side edge and the inner side edge of the runner hub.

In one embodiment, the grooves in the runner hub may be tangentially wider at the outer edge portion of the runner hub than at the inner edge portion of the runner hub. This may be appropriate when the runner is used in a turbine in which the water velocity, and thus the wear, is the highest at the inlet, that is to say at the outer edge portion of the runner. A wider groove will allow a wider, more wear-resistant base, whereby the lifetime of the hydraulic fluid flow machine can be further improved.

In one embodiment, the runner may be closed by means of a ring. The ring may be formed, at least in a portion, with grooves corresponding to the grooves of the runner hub, whereby the vanes may be held fixed between the ring and the runner hub. The grooves in the ring could extend, in the same way as those of the runner hub, all the way out to and/or in to the outer edge portion and the inner edge portion, respectively, of the runner hub.

In one embodiment, the vanes may be formed with hollow keys at their transitions to the runner hub. This will improve the wear resistance at the transition between the vane and the runner hub.

In one embodiment, the vanes may be formed with hollow keys at their transitions to the ring. This has the same advantage as that mentioned above.

In one embodiment, the bases may be attached to the runner hub by means of bolt connections. This will improve the attachment of the vanes to the runner hub. The bases can also be attached to the ring by means of bolt connections.

In a second aspect, the invention relates to a method of providing a runner for a hydraulic fluid flow machine, the runner including a runner hub and a number of vanes distributed around the centre axis of the runner, the vanes being releasably connected to the runner by means of bases that complementarily fit grooves in the runner hub, characterized by the method including the step of:

forming the runner hub with grooves extending, at least at one of the outer edge portion or the inner edge portion of the runner hub, respectively all the way out to or all the way in to the edge portion, whereby the bases may be extended radially out to or in to at least one of the outer edge portion or the inner edge portion of the runner hub.

A hydraulic fluid flow machine including a runner in accordance with the above description is described as well.

In one embodiment, the hydraulic fluid flow machine may be a turbine.

In what follows, an example of a preferred embodiment is described, which is visualized in the accompanying drawings, in which.

In what follows, the reference numeral 1 indicates a runner in accordance with the present invention. The runner 1 includes a runner hub 2 to which a plurality of vanes 4 are arranged to be attached.

Figure 1:
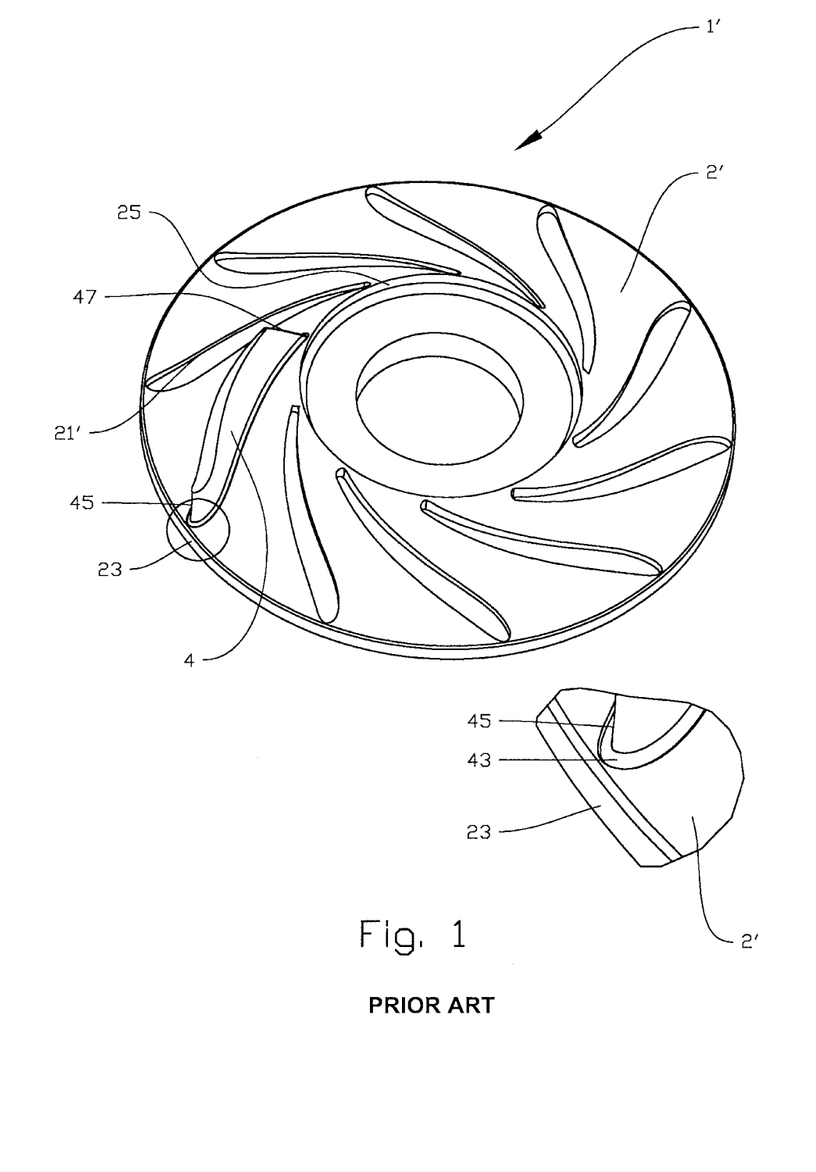
FIG. 1 shows a prior-art runner hub in a perspective view.

At the top of FIG. 1, a runner 1' with a runner hub 2' in accordance with the prior art is shown. The runner hub 2' is formed with ten grooves 21' into which vanes 4 may be attached. In the figure, for the sake of exposition, only one of the grooves 21' is provided with a vane 4. The grooves 21', which extend both radially and tangentially across the runner hub 2', substantially follow the curvature of the vanes 4. As it can best be seen at the bottom of FIG. 1, where an enlarged portion of the runner hub 2' is shown, there is a radial clearance between the groove 21' and the outer edge portion 23 of the runner hub 2'. This clearance makes water, entering at great velocity substantially tangentially to the outer edge portion 23 of the runner hub 2', have a large component of velocity normal to the transition between an outer edge portion 45 of the vane 4 and the runner hub 2', the transition being formed by a hollow key 43. As described above, this could lead to particularly extensive wear on the transition between the vane 4 and the runner hub 2', which reduces the lifetime of a hydraulic fluid flow machine in which the runner 1' is rotating around an axis S, see FIG. 4.

Figure 2:
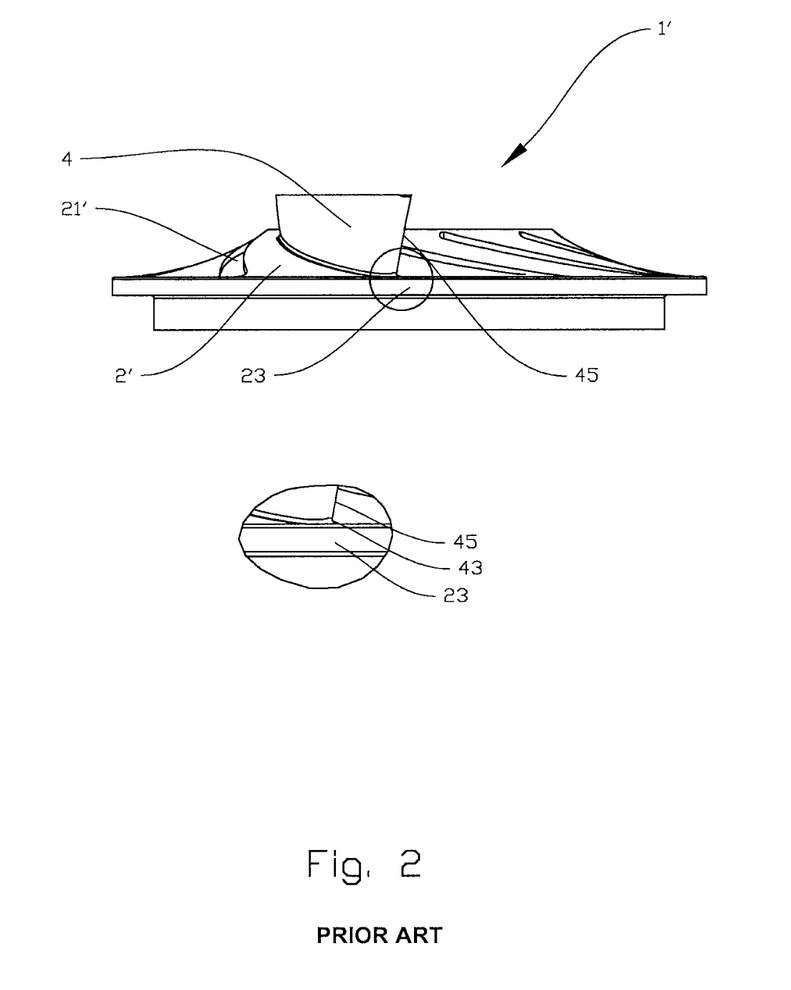
FIG. 2 shows the runner hub of FIG. 1 in a side view.

At the top of FIG. 2, the runner hub of FIG. 1 is shown in a side view. At the bottom of the figure, an enlarged detail is shown, in which the transition of the vane 4 to the runner hub 2' via the hollow key 43 is well visible.

Figure 3:
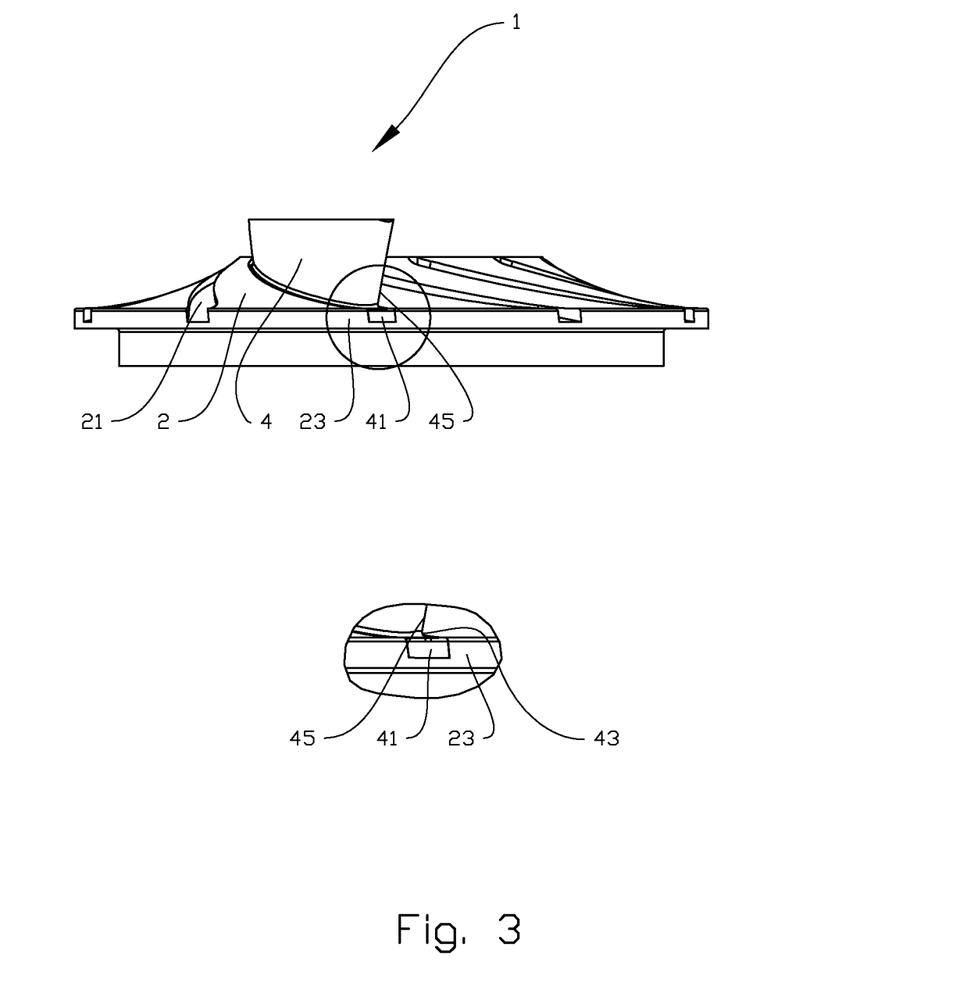
FIG. 3 shows a runner hub in accordance with the present invention in a side view.

FIG. 3 shows a runner hub 2 in accordance with the present invention. For the sake of exposition, this runner hub 2 is shown with just one vane 4 as well. An enlarged detail is shown at the bottom of the figure. In the runner hub 2, as opposed to in the runner hub 2' of FIGS. 1 and 2, a groove 21 extends all the way out to the outer edge portion 23 of the runner hub 2 and all the way in to the inner edge portion 25 of the runner hub 2, the latter being seen best in FIG. 5. A base 41 of the vane 4 has been fitted into the groove 21 of the runner hub 2. The base 41 is further screwed into the runner hub 2 by means of screw connections 3, see FIG. 7. As it can be seen from the figure, the base 41 extends all the way out to the outer edge portion 23 of the runner hub 2 in the groove 21. A portion of the runner 1 which is highly subject to wear, the transition between the vane 4 and the runner hub 2, is thereby moved away from an area having high water velocity and out towards a gap, not shown, between the runner 1 and stationary parts, not shown, of a hydraulic fluid flow machine.

Figure 4:
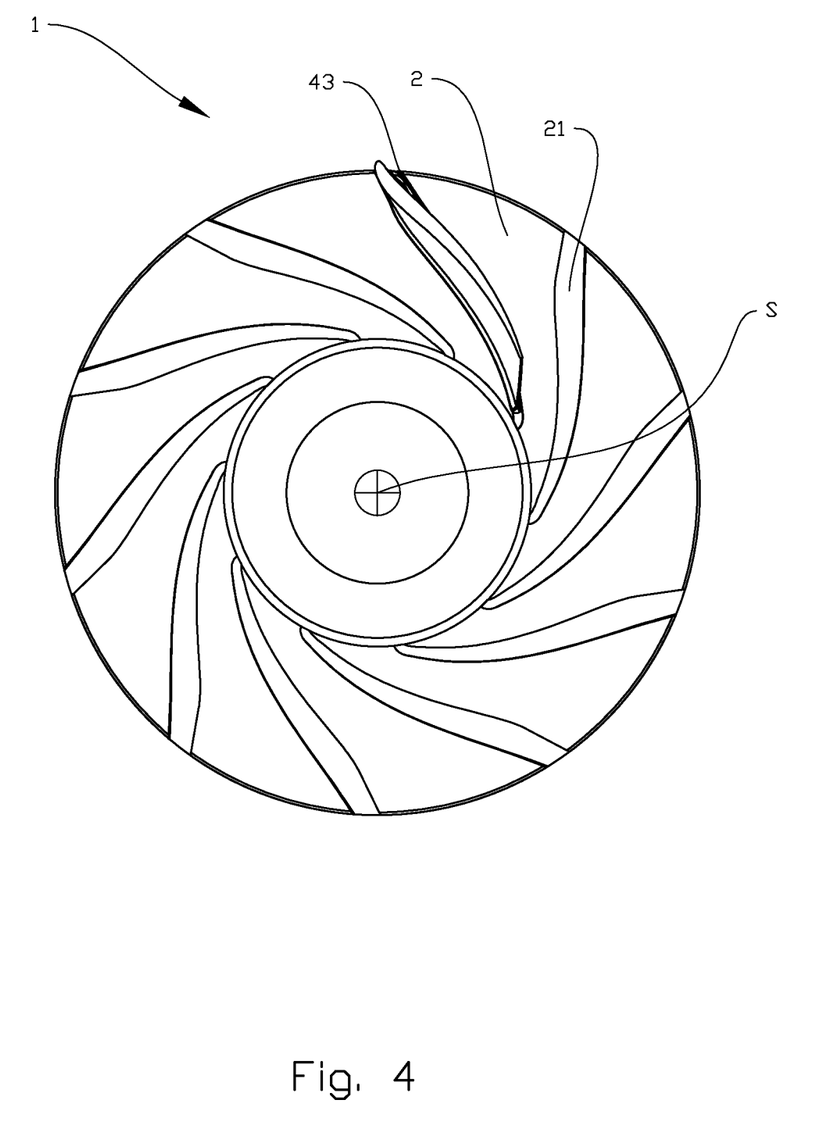
FIG. 4 shows a runner hub in accordance with the present invention in a view from above.
Figure 5:
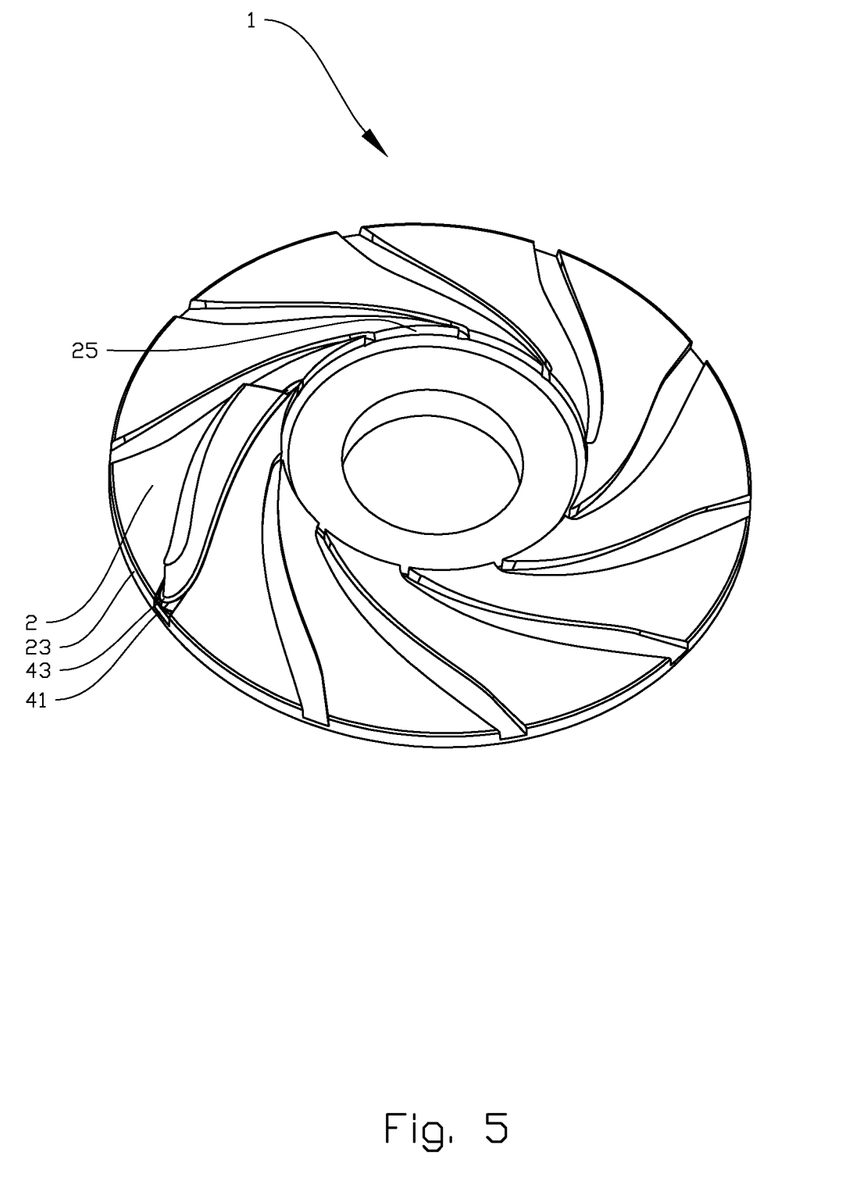
FIG. 5 shows a runner hub in accordance with the present invention in a perspective view.

FIGS. 4 and 5 show the runner hub 2 from FIG. 3 viewed respectively from above and in perspective. In FIG. 5 the inner edge portion 25 of the runner hub 2 is shown as well.

Figure 6:
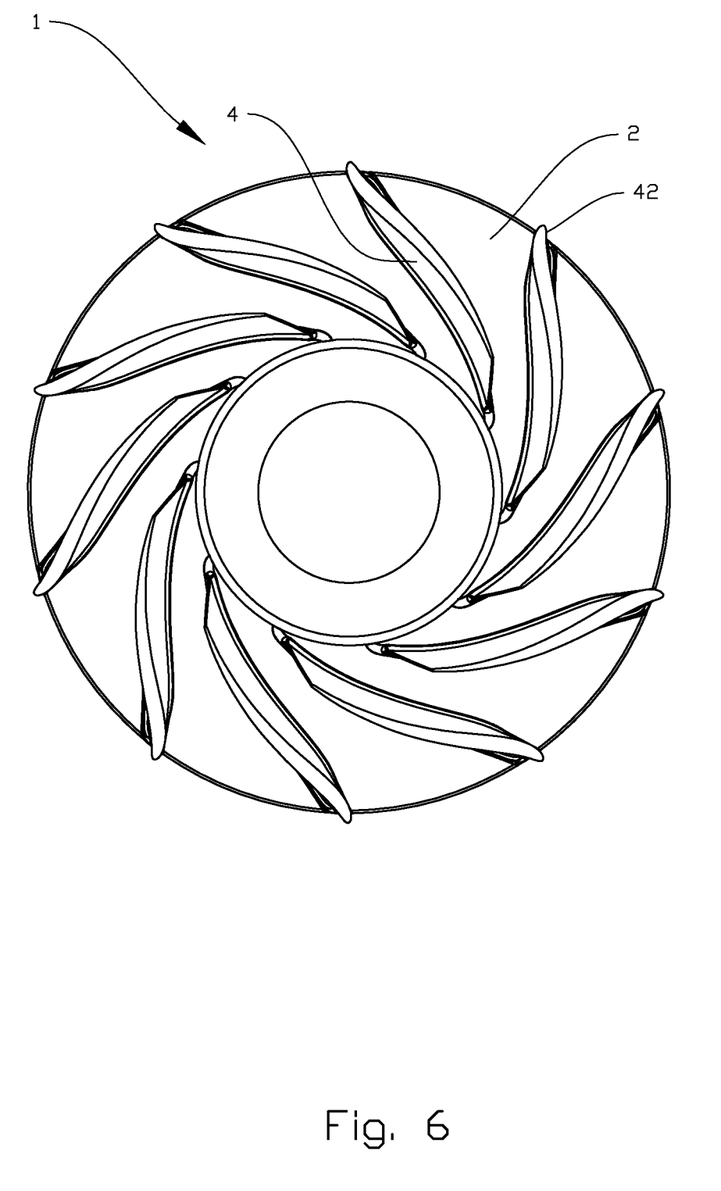
FIG. 6 shows a runner hub in accordance with the present invention in a view from above.

FIG. 6 shows a runner 1 in accordance with the present invention with ten vanes 4 attached to the runner hub 2. The vanes 4 are also formed with upper bases 42 for attachment to a ring, not shown, which is mounted on top of the vanes 4 to close the runner 1, see for example the above-mentioned patent document NO 327520 B1.

Figure 7:
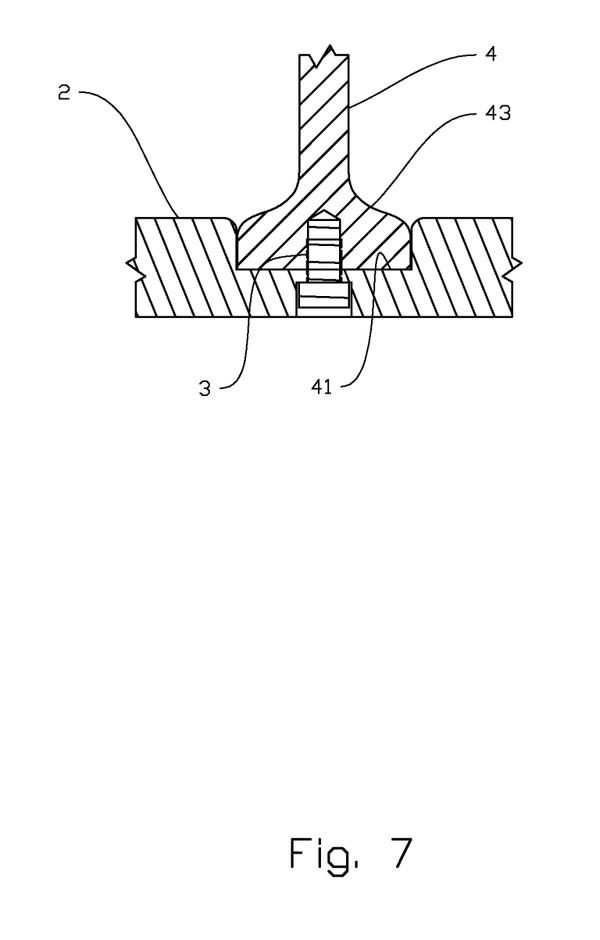
FIG. 7 shows, in a side view and on a larger scale, a section viewed through a runner hub and a vane in accordance with the present invention.

FIG. 7 shows a section through a portion of a runner hub 2 with a vane 4 attached to it. The figure also shows clearly the transition of the vane 4 to the base 41 via the hollow key 43. An attachment bolt 3 has been screwed into the base 41 from the bottom side of the runner hub 2 to improve the attachment of the vane 4 to the runner hub 2.

The invention claimed is:

1. A runner device for a hydraulic fluid flow machine, the runner including a runner hub and a number of vanes distributed around the centre axis of the runner, the vanes being releasably connected to the runner by means of bases that complementarily fit grooves in the runner hub, the bases filling the grooves in the runner hub, wherein the grooves in the runner hub extend radially across the runner hub from an outer edge portion and to an inner edge portion so that there is no radial clearance between the grooves and the inner edge portion of the runner hub and/or between the grooves and the outer edge portion of the runner hub.

2. The device in accordance with claim 1, wherein the grooves extend from the outer edge portion and to the inner edge portion of the runner hub so that there is no radial clearance between the grooves and the inner edge portion of the runner hub and between the grooves and the outer edge portion of the runner hub.

3. The device in accordance with claim 1, wherein the grooves in the runner hub are tangentially wider at the outer edge portion of the runner hub than at the inner edge portion of the runner hub.

4. The device in accordance with claim 1, wherein the runner is closed by means of a ring.

5. The device in accordance with claim 1, wherein the vanes are formed with hollow keys at their transitions to the runner hub.

6. The device in accordance with claim 4, wherein the vanes are formed with hollow keys at their transitions to the ring.

7. The device in accordance with claim 1, wherein the base is connected to the runner hub by means of a bolt connection.

8. A hydraulic fluid flow machine including a runner in accordance with claim 1.

9. A turbine including a runner in accordance with claim 1.

10. A method of providing a runner for a hydraulic fluid flow machine, the runner including a runner hub and a number of vanes distributed around the centre axis of the runner, the vanes being releasably connected to the vane by means of bases that complementarily fit grooves in the runner hub, wherein the method includes the step of:

forming the runner hub with grooves which extend radially across the runner hub from an outer edge portion and to an inner edge portion so that there is no radial clearance between the grooves and the inner edge portion of the runner hub and/or between the grooves and the outer edge portion of the runner hub.

\* \* \* \* \*